US008517825B2

(12) United States Patent
Olive

(10) Patent No.: US 8,517,825 B2
(45) Date of Patent: Aug. 27, 2013

(54) GAMING MACHINE WITH WAGERING FEATURES

(75) Inventor: Scott Olive, Lane Cove (AU)

(73) Assignee: Aristocrat Technologies Australia Pty Ltd. (AU)

( * ) Notice: Subject to any disclaimer, the term of this patent is extended or adjusted under 35 U.S.C. 154(b) by 0 days.

(21) Appl. No.: 13/336,830

(22) Filed: Dec. 23, 2011

(65) Prior Publication Data

US 2012/0094742 A1 Apr. 19, 2012

Related U.S. Application Data

(63) Continuation of application No. 10/364,892, filed on Feb. 12, 2003.

(30) Foreign Application Priority Data

Feb. 13, 2002 (AU) ........................................ PS0526

(51) Int. Cl.
*A63F 13/02* (2006.01)
*A63F 13/10* (2006.01)
*G07F 17/32* (2006.01)

(52) U.S. Cl.
CPC ........ *G07F 17/3258* (2013.01); *G07F 17/3262* (2013.01); *G07F 17/3267* (2013.01); *G07F 17/3211* (2013.01)
USPC ................................................ 463/25; 463/29

(58) Field of Classification Search
CPC ............ G07F 17/3258; G07F 17/3262; G07F 17/3267; G07F 17/3211; A63F 13/02; A63F 13/10
USPC ........................................ 463/16, 20, 25, 29
See application file for complete search history.

(56) References Cited

U.S. PATENT DOCUMENTS 5,775,692 A * 7/1998 Watts et al. ............... 273/143 R
6,059,289 A * 5/2000 Vancura .................... 273/143 R

* cited by examiner

*Primary Examiner* — David L Lewis
*Assistant Examiner* — Matthew D. Hoel
(74) *Attorney, Agent, or Firm* — McAndrews, Held & Malloy, Ltd.

(57) ABSTRACT

A gaming machine 10 has a display 14 and a game controller arranged to control images of symbols displayed on the display 14. The game controller is arranged to play a game 16 in which at least one random event is caused to be displayed on the display 14. If a predefined winning event occurs, the machine 10 awards a prize. When a trigger condition occurs during the playing of a base game, a first feature is awarded that results in a feature prize potentially made up of a plurality of individual prizes. After completion of the first feature, a second feature occurs that enables a player to wager the feature prize for at least one other prize which is independent of a value of the feature prize.

10 Claims, 6 Drawing Sheets

GAMING MACHINE WITH WAGERING FEATURES

RELATED APPLICATION

This present Application is continuation application of co-pending application with U.S. application Ser. No. 10/364,982, filed Feb. 12, 2003, which claims priority to Australian Patent Application No. PS0526, filed Feb. 13, 2002, the entire contents of which are incorporated herein by reference.

FIELD OF THE INVENTION

This invention relates to a gaming machine. More particularly, the invention relates to a gaming machine and to an improvement to a game played on such a gaming machine.

BACKGROUND TO THE INVENTION

Players who regularly play gaming machines quickly tire of particular games and therefore it is necessary for manufacturers of these machines to develop innovative game features which add interest to the games. In so doing, it is hoped to keep players amused and therefore willing to continue playing the game as well as to attract new players.

Also, with the growth that has occurred in the gaming machine market, there is intense competition between manufacturers to supply various existing and new venues. When selecting a supplier of gaming machines, the operator of a venue will often pay close attention to the popularity of various games with their patrons. Therefore, gaming machine manufacturers are keen to devise games and/or game features which are popular with the players as a mechanism for improving sales, retaining customers and attracting new customers.

SUMMARY OF THE INVENTION

According to the invention, there is provided a gaming machine having a display means and a game control means arranged to control images of symbols displayed on the display means, the game control means being arranged to play a game in which at least one random event is caused to be displayed on the display means and, if a predefined winning event occurs, the machine awards a prize, wherein, when a trigger condition occurs during the playing of a base game, a first feature is awarded that results in a feature prize potentially made up of a plurality of individual prizes and, after completion of the first feature, a second feature occurs that enables a player to wager the feature prize for at least one other prize which is independent of a value of the feature prize.

It is to be noted that, in the playing of a feature game there is often no guaranteed prospect of obtaining prizes. However, in the large majority of cases such a feature game does have a tendency to result in the awarding of prizes. Conventionally, the feature game may be made up of a plurality of sub-games.

Thus, for example, the first feature may be a series of free games where the sub-games are the individual free games. While the outcome of such free games is generally random, it is to be expected that, in such a series of free games, a number of the free games will have prize winning results.

For ease of explanation, the invention will be described with reference to spinning reel games. It will, however, be appreciated that at least the base game may be a different type of game such as a card game, a ball game, or the like.

The trigger condition may govern the length of the first feature. Where the base game is a spinning reel game, the trigger condition may be the presence of a number of predetermined symbols, for example, scatter symbols. The number of scatter symbols may determine the duration of the first feature. More particularly, the number of scatter symbols appearing in the base game may determine the number of free games in the series of free games.

If, during any one of the free games in the first feature, the trigger condition reoccurs, a further series of free games may be added to the remaining free games of the first series of free games in the feature.

Further, any wins awarded during the first feature may be greater than the corresponding win occurring in the base game. Hence, the prize associated with any winning combination of symbols in one of the feature games may, for example, be trebled with respect to the corresponding combination of symbols in the base game.

During the playing of the first feature, a dedicated feature prize display component may be displayed on the display means. The display component may be in the form of a secondary win meter which is displayed only during the playing of the first feature. Any wins resulting from free games in the first feature may be added to the secondary win meter and not to a primary win meter and a credit meter of the gaming machine. In the playing of the second feature, if the player chooses the first option, ie. to take the win from the first feature, the amount displayed on the secondary win meter, if any, is transferred to the primary win meter and the credit meter of the gaming machine. If the player chooses either the second option or the third option, the total amount displayed on the secondary win meter, if any, as a result of the playing of the free games is deleted.

The second feature may commence automatically after completion of the first feature. The second feature may be a second screen feature where the player is granted a number of options. More specifically, the options may be, firstly, the player may take the feature prize and either continue playing or cash out. Secondly, the player may wager the feature prize by playing a new feature. Thirdly, the player may wager the feature prize against a mystery prize.

If the player selects the second option, the feature prize resulting from the playing of the first feature may be deleted from the feature prize display component and a new feature, with outcomes independent of, and different from, the first feature may be played. The player may then be awarded the result of the playing of the new feature.

The mystery prize may be one of a mystery amount of credits, a set of bonus games and a stand-alone or linked progressive prize.

When the second feature commences, the control means may indicate to the player which of the options the control means recommends the player takes. For example, if the prize from the first feature is equal to or above the an average prize for the first feature, the control means may highlight the first option to take the prize from the first feature. The highlighting of the first option may be effected by displaying an appropriate message or by flashing the appropriate icon on the display. Conversely if the prize from the first feature is less than the average prize for the first feature, then the second and/or third options may be highlighted by the control means. This indication of the optimal strategy helps to maintain the return to player percentage of the gaming machine as close as possible to optimal and may be required by regulators in certain jurisdictions.

The second feature may be implemented by way of a touch sensitive screen display with icons which are touched by the player to indicate the selection made by the player.

BRIEF DESCRIPTION OF THE DRAWINGS

The invention is now described by way of example with reference to the accompanying diagrammatic drawings in which.

DETAILED DESCRIPTION OF THE DRAWINGS

Figure 1:
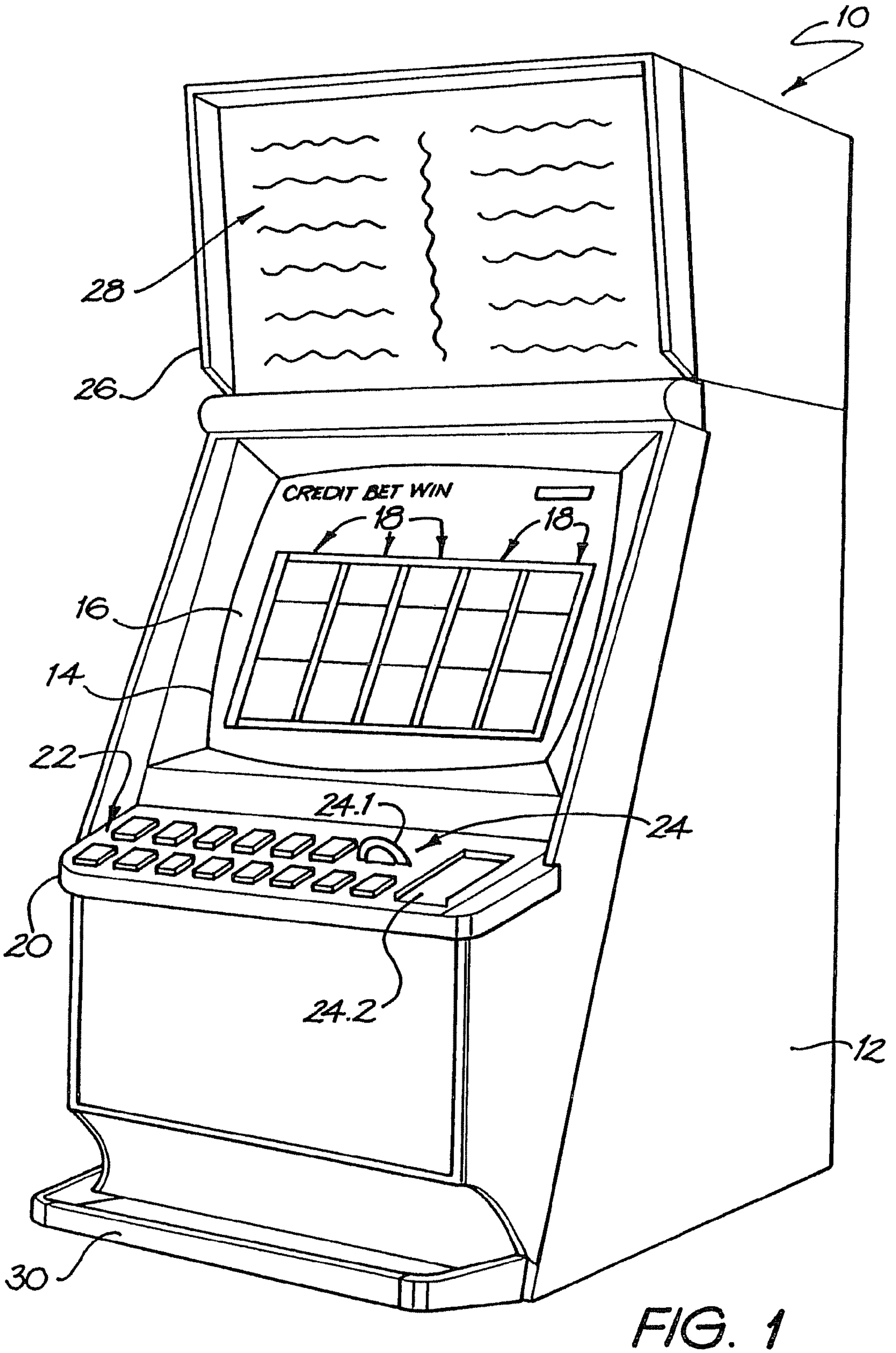
FIG. 1 shows a perspective view of a gaming machine, in accordance with the invention.

In FIG. 1, reference numeral 10 generally designates a gaming machine, including a game, in accordance with the invention. The machine 10 includes a console 12 having a video display unit 14 on which a game 16 is played, in use. The game 16 is a spinning reel game which simulates the rotation of a number of spinning reels 18. A midtrim 20 of the machine 10 houses a bank 22 of buttons for enabling a player to play the game 16. The midtrim 20 also houses a credit input mechanism 24 including a coin input chute 24.1 and a bill collector 24.2.

The machine 10 includes a top box 26 on which artwork 28 is carried. The artwork 28 includes paytables, details of bonus awards, etc.

A coin tray 30 is mounted beneath the console 12 for cash payouts from the machine 10.

Figure 2:
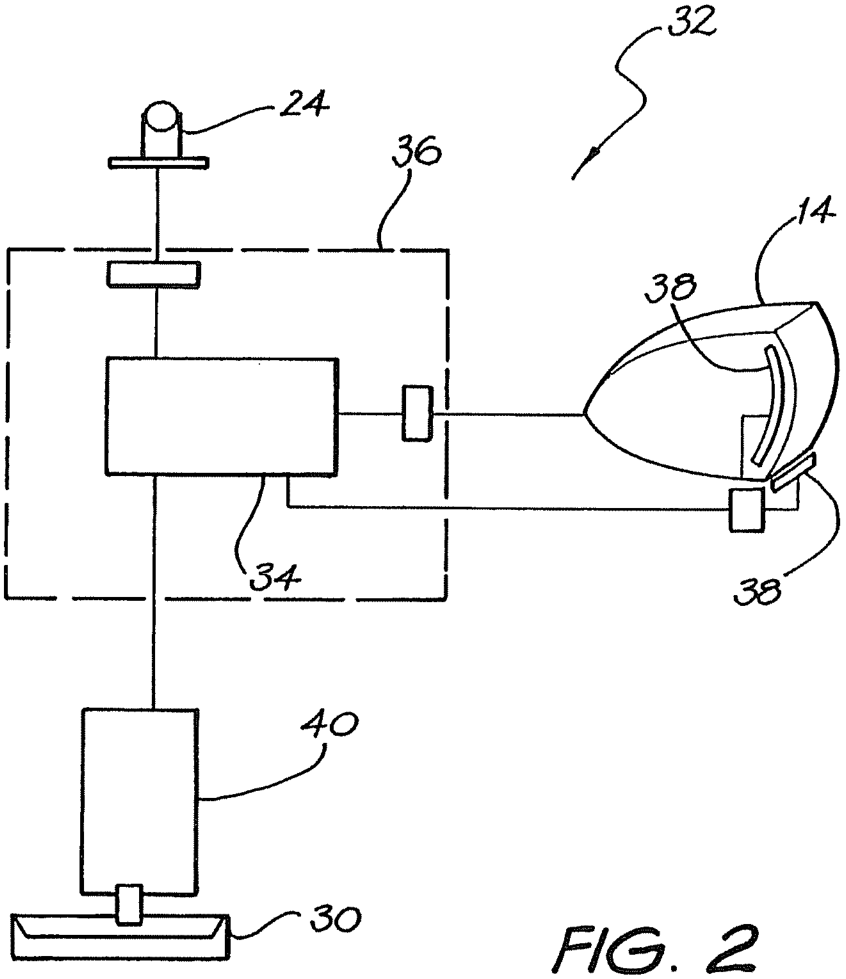
FIG. 2 shows a block diagram of a control circuit of the gaming machine.

Referring now to FIG. 2 of the drawings, a control means or control circuit 32 is illustrated. A program which implements the game and user interface is run on a processor 34 of the control circuit 32. The processor 34 forms part of a controller 36 which drives the screen of the video display unit 14 and which receives input signals from sensors 38. The sensors 38 include sensors associated with the bank 22 of buttons and touch sensors mounted in the screen of the video display unit 14. The controller 36 also receives input pulses from the mechanism 24 to determine whether or not a player has provided sufficient credit to commence playing. The mechanism 24 may, instead of the coin input chute 24.1 or the bill collector 24.2, or in addition thereto, be a credit card reader (not shown) or any other type of validation device.

Finally, the controller 36 drives a payout mechanism 40 which, for example, may be a coin hopper for feeding coins to the coin tray 30 to make a pay out to a player when the player wishes to redeem his or her credit.

Figure 3:
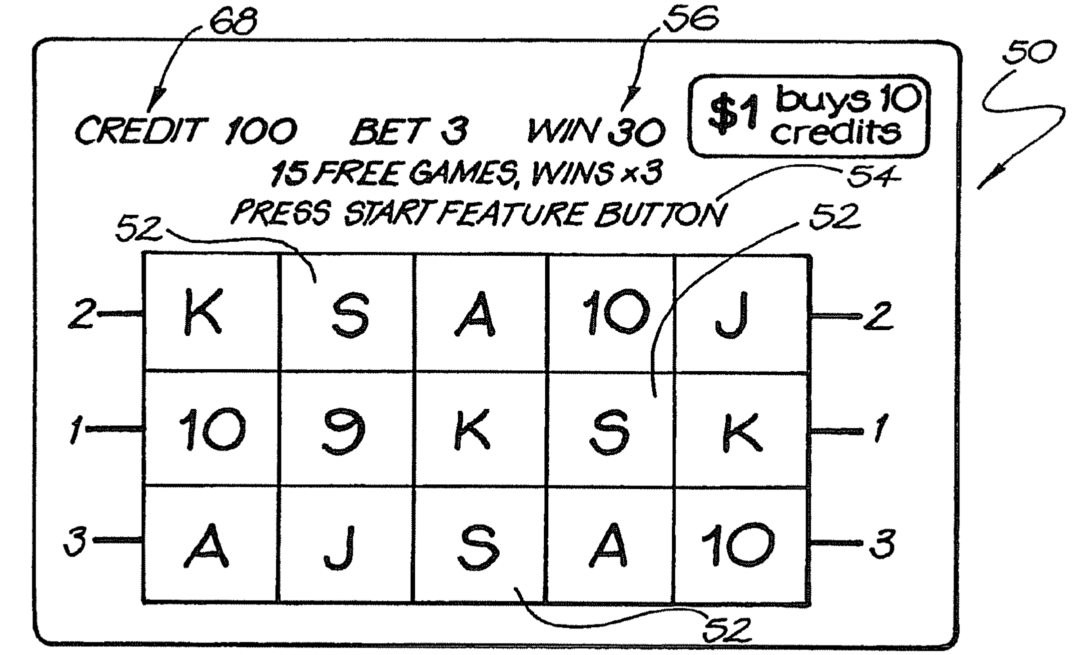
FIG. 3 shows a screen display of a base game of a game played on the gaming machine of FIG. 1.

The game 16 comprises a base game which could be any type of wagering game. In the example illustrated, the base game is a spinning reel game and a screen display 50 is shown in FIG. 3 of the drawings. In the example shown in FIG. 3 of the drawings, three scatter symbols 52 are spun up. This serves as a trigger condition resulting in the awarding of a first feature. For the occurrence of 3×scatter symbol 52, a prize of 30 credits is awarded which is credited to a win meter 56 of the machine 10.

The first feature comprises fifteen free games. The number of free games awarded is governed by the number of scatter symbols which served as the trigger condition spun up in the base game. Thus, for three scatter symbols 52, fifteen free games are awarded in the first feature, for four scatter symbols in the base game, twenty free games are awarded in the first feature and for five scatter symbols in the base game, twenty five free games are awarded. All wins during the free games are trebled in comparison with the corresponding win in the base game.

When the trigger condition occurs in the base game, the player is invited to press a "Start Feature" button in the bank 22 of buttons by way of an appropriate message 54 on the screen display 50. Once the Start Feature button has been pressed, the free games commence.

Figure 4A:
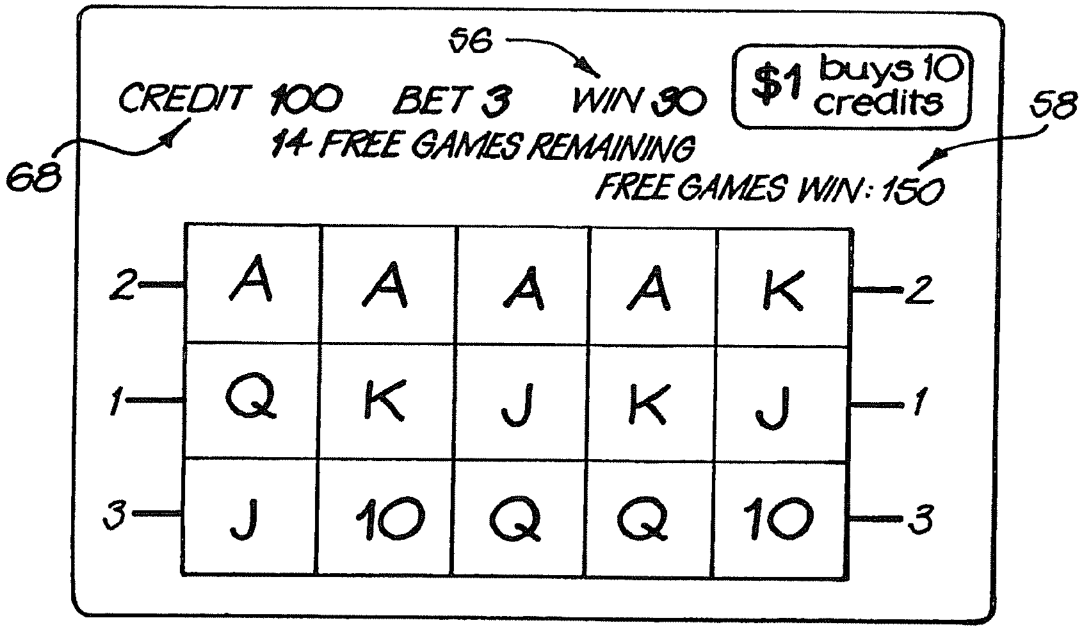
FIGS. 4*a*-4*c* show screen displays of three games of a first feature of the game.

A screen display showing the result of a first free game of the first feature is shown in FIG. 4*a* of the drawings where a win is paid for 4×A on payline 2. If such a win had occurred in the base game, fifty credits would have been awarded. However, because it is in the free game, the win is trebled so that one hundred and fifty credits are awarded. The win is not credited to the conventional win meter 56 of the machine 10. Rather, the win is credited to a dedicated feature prize display component in the form of a secondary win meter 58.

Figure 4B:
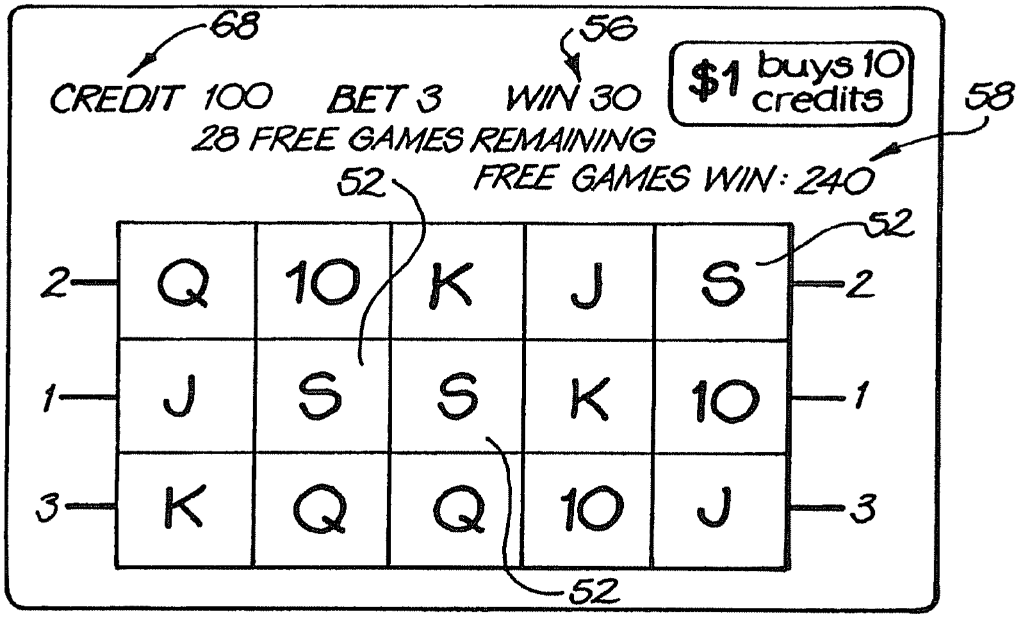

In the next free game, as shown in FIG. 4*b* of the drawings, a further three scatter symbols 52 are spun up in the free game. This serves as a further trigger condition so that a further fifteen free games are awarded and are added to any free games remaining from the preceding sequence of free games. A win of ninety credits is awarded for the three scatter symbols having been spun up in the second free game so that the secondary win meter 58 is credited with a further ninety credits.

Figure 4C:
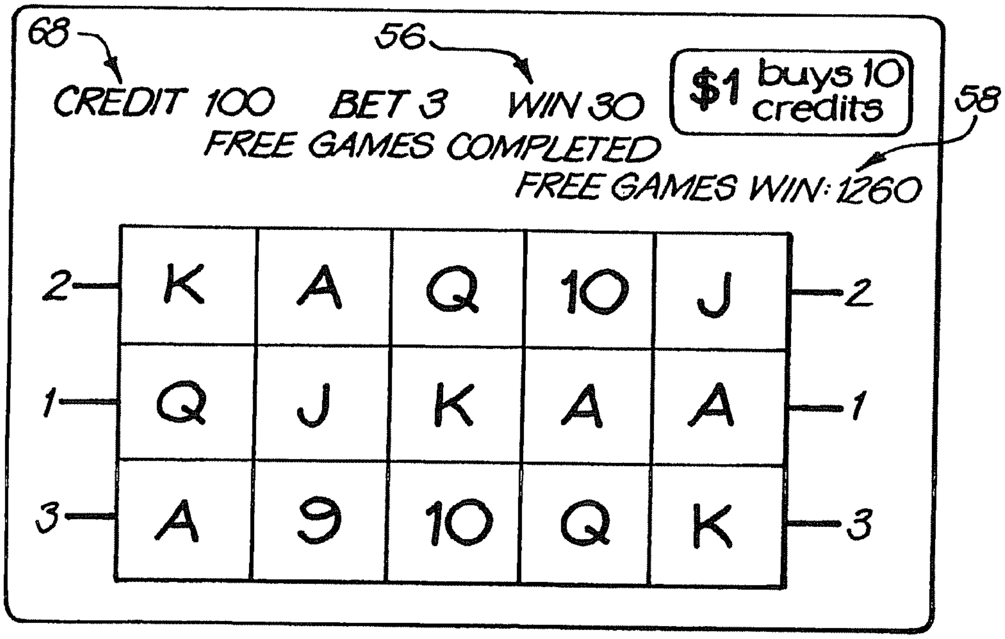

The free games are played automatically after crediting of the secondary win meter 58 until, after completion of the free games, a screen display such as shown in FIG. 4*c* of the drawings is displayed on the video display unit 14. It is assumed that, as a result of the free games, a total win in the free games of 1260 credits has been accumulated on the secondary win meter 58.

Figure 5:
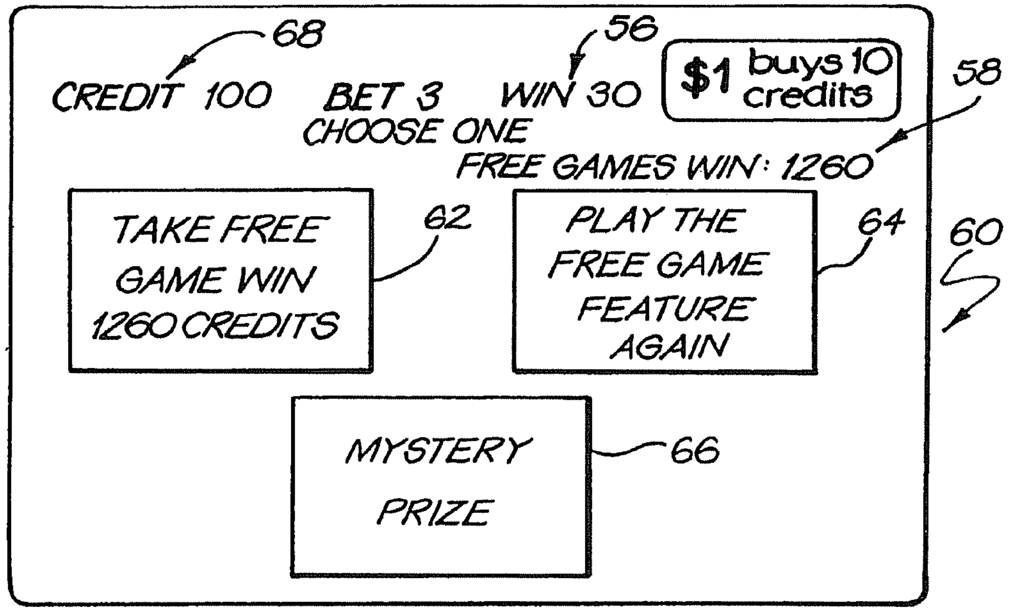
FIG. 5 shows a screen display of a second feature of the game.

After completion of the first feature, ie. the sequence or sequences of free games, a second feature commences, the screen display of which is shown at 60 in FIG. 5 of the drawings. The secondary win meter 58 continues to be displayed.

The second feature comprises three icons 62, 64 and 66. The effect of this is to grant to the player three options with respect to the win resulting from the first feature.

Figure 6:
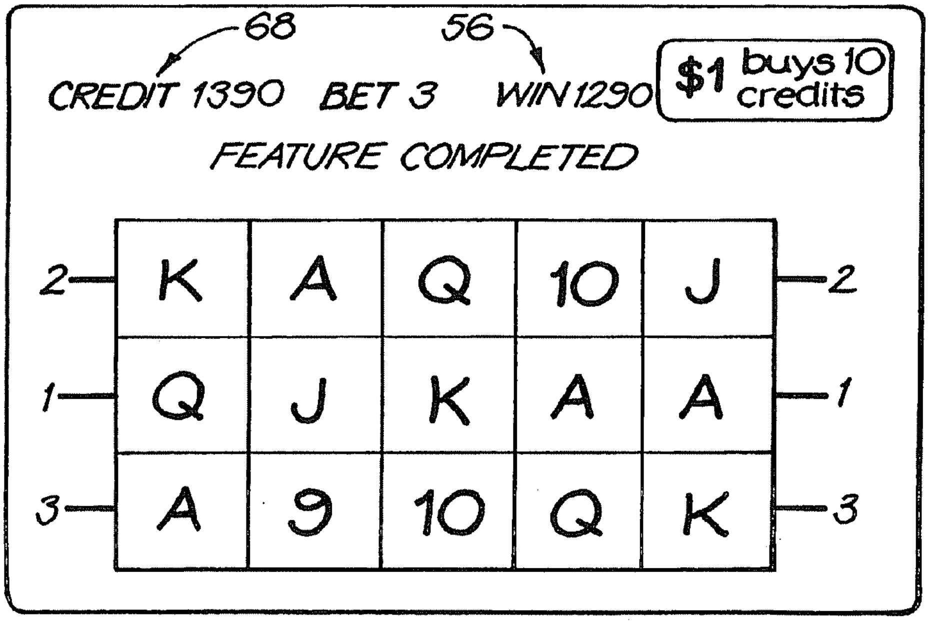
FIG. 6 shows a screen display after completion of the second feature.
Figure 7:
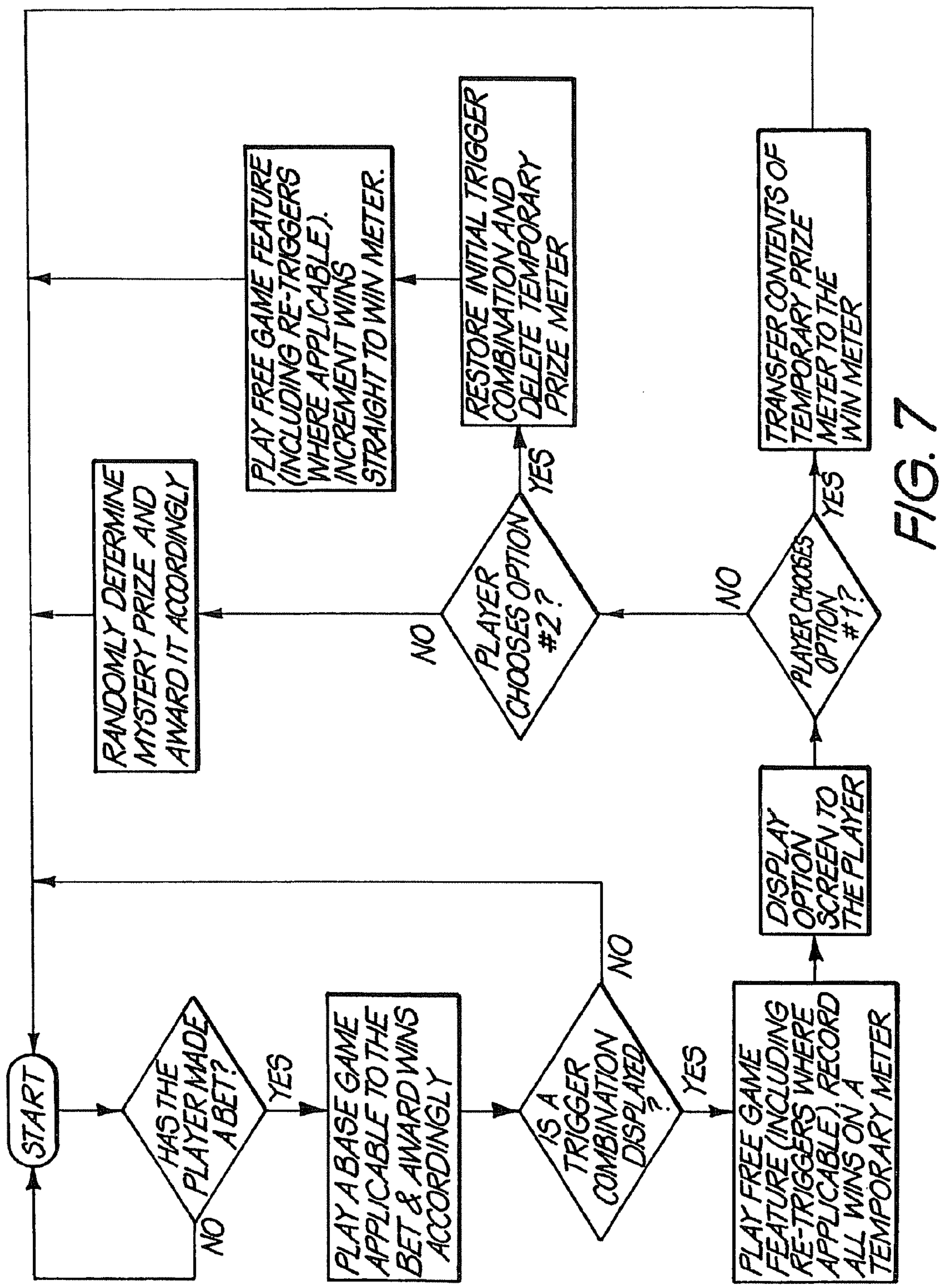
FIG. 7 shows a flow chart of the game.

Firstly, the player could touch the icon 62 where the credits on the secondary win meter are credited to the primary win meter 56 and such a result is shown in FIG. 6 of the drawings. The game which is displayed on the screen display in FIG. 6 of the drawings is the final free game of the first feature and this remains displayed until the next base game is played.

If, instead, the player chooses the icon 64 and touches it, all wins standing to the credit of the secondary win meter 58 are deleted and a free game feature is recommenced. This is not the same free game feature as was previously played but is a new free game feature. In contrast to the first sequence of free games played, any prizes awarded during the playing of the free games of the free game feature are not credited to the secondary win meter 58 but directly to the conventional win meter 56 as, after playing of the new free game feature, the feature is regarded as completed. In other words, the player is not granted a further opportunity to wager the result of the new free game feature.

If the player chooses icon 66, once again, the credit standing to the credit of the secondary win meter 58 is deleted from the meter 58. A random prize is selected by the controller 36 of the gaming machine 10 from a predetermined look-up table and an animation is used to reveal the mystery prize. The mystery prize could be an amount of credits, a number of bonus free games or a stand-alone or linked progressive prize. If the mystery prize is a number of credits, the credits are credited directly to the conventional win meter 56 and not to the secondary win meter 58.

Once again, upon completion of the revealing of the mystery prize or, if the mystery prize results in the playing of bonus free games, the playing of those bonus free games, the feature is regarded as completed and the machine reverts to a stand-by state for the next game for which a wager is required.

Accordingly, it is an advantage of the invention that a gaming machine 10 is provided which increases the excitement of a game played on such a gaming machine 10, prolongs such excitement and enables a player to play the gaming machine longer without necessarily having to wager additional money.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for use with a gaming machine having a gaming controller, a video display and a win meter, and being arranged to facilitate play of a first game and a second game, the method comprising:

playing the first game via the video display;

playing a first plurality of the second games via the video display if a predefined outcome occurs during the play of the first game, and accumulating credits won during said first plurality of second games;

displaying on the video display a plurality of prompts at the completion of the play of the first plurality of second games;

receiving via the gaming controller one selection of one of said plurality of prompts;

playing via the video display a second plurality of the second games, cancelling said credits accumulated during playing of said first plurality of second games, accumulating credits won during said playing of said second plurality of second games, and adding said credits accumulated during said playing of said second plurality of second games to said win meter, when a first of the plurality of prompts is the one selection received;

adding said credits accumulated during the first plurality of second games to said win meter when a second of the plurality of prompts is the one selection received; and selecting via the gaming controller a mystery prize from a plurality of available prizes, and cancelling said credits accumulated during said first plurality of second games, when a third of the plurality of prompts is the one selection received.

2. The method as claimed in claim 1, and further comprising displaying via the video display a feature meter depicting credits awarded during the play of the first plurality of second games, and wherein the method further comprises setting the feature meter at the completion of the first plurality of the second games to depict a zero value, when the first of the plurality of prompts is the one selection received.

3. The method as claimed in claim 1, and further comprising displaying via the video display a feature meter and the method comprising:

displaying via the feature meter credits accumulated during said play of the first plurality of second games; and wherein said adding said credits accumulated during the first plurality of second games to said win meter comprises:

setting the feature meter to depict a zero value; and setting the win meter to depict a sum of the credits accumulated at the completion of the play of the first plurality of second games and the credits displayed prior to the play of the first plurality of second games.

4. The method as claimed in claim 1, and wherein said selecting a mystery prize includes:

randomly selecting the mystery prize, and wherein the mystery prize comprises at least one of: a number of credits, a number of free games, and a progressive jackpot.

5. The method as claimed in claim 1, wherein the first game comprises a spinning reel game of chance, and each of the second games comprise a free spin of the spinning reel game of chance.

6. A gaming machine comprising:

a win meter to depict a number of awarded credits;

a game controller arranged to facilitate play of a first game and to determine if a predetermined outcome occurs during play of the first game;

a video display arranged (1) to provide a play of a first plurality of second games if the predefined outcome occurs, (2) to display a plurality of prompts at the completion of the play of the first plurality of second games, and (3) to provide a play of a second plurality of second games; and wherein said game controller is arranged to accumulate credits won during play of said first plurality of second games, said game controller arranged to receive one selection of one of said plurality of prompts, and a. to facilitate play via said video display of a second plurality of second games, to cancel said credits accumulated during play of said first plurality of second games, to accumulate credits won during said play of said second plurality of second games, and to add credits accumulated during said play of said second plurality of second games to said win meter, when a first of the plurality prompts is the one selection received, and b. to add the credits accumulated at the completion of the first plurality of the second games to said win meter when a second of the plurality of prompts is the one selection received, and c. to select a mystery prize from a plurality of available prizes, and to cancel said credits accumulated during play of said first plurality of second games, when a third of the plurality of prompts is the one selection received.

7. The gaming machine as claimed in claim 6, and wherein the first of the plurality of prompts is a first selectable prompt, and wherein the video display is arranged to display a feature meter depicting credits awarded during the play of the first plurality of second games, and wherein the game controller is arranged to set the feature meter at the completion of the first plurality of the second games to depict a zero value, when the first selectable prompt is selected.

8. The gaming machine as claimed in claim 6, and wherein the video display is arranged to display a feature meter depicting credits awarded during the play of the first plurality of second games, and wherein the game controller is further arranged to a) display via the feature meter credits accumulated during said play of the first plurality of second games, b) set the feature meter to depict a zero value, and c) set the win meter to depict a sum of the credits awarded at the completion of the play of the first plurality of second games and the credits displayed prior to the play of the first plurality of second games.

9. The gaming machine as claimed in claim 6, wherein the game controller is arranged to to randomly select the mystery prize, and wherein the mystery prize comprises at least one of: a number of credits, a number of free games, and a progressive jackpot.

10. The gaming system as claimed in claim 6, wherein the first game comprises a spinning reel game of chance, and each of the second games comprise a free spin of the spinning reel game of chance.

* * * * *